United States Patent [19]

Knoll et al.

[11] Patent Number: 5,615,404

[45] Date of Patent: Mar. 25, 1997

[54] SYSTEM HAVING INDEPENDENTLY ADDRESSABLE BUS INTERFACES COUPLED TO SERIALLY CONNECTED MULTI-PORTED SIGNAL DISTRIBUTORS GENERATING AND MAINTAINING FRAME BASED POLLING SCHEDULE FAVORING ISOCHRONOUS PERIPHERALS

[75] Inventors: Shaun Knoll, Portland, Oreg.; Jeff C. Morriss, Boulder Creek, Calif.; Shelagh Callahan, Beaverton, Oreg.; Ajay V. Bhatt; Puthiya K. Nizar, both of El Dorado Hills, Calif.; Richard M. Haslam, Hillsboro, Oreg.; Andrew M. Volk, Loomis, Calif.; Sudarshan B. Cadambi, Portland, Oreg.

[73] Assignee: Intel Corporation, Santa Clara, Calif.

[21] Appl. No.: 332,255

[22] Filed: Oct. 31, 1994

[51] Int. Cl.⁶ .................................................. G06F 13/12
[52] U.S. Cl. ........................ 395/882; 395/864; 395/823; 395/290; 395/421.01
[58] Field of Search .................................. 395/822, 837, 395/838, 848, 857, 866, 882, 864, 823, 290, 421.01; 370/13, 85.8, 85.6, 94.1

[56] References Cited

U.S. PATENT DOCUMENTS

| 3,245,045 | 4/1966 | Randlev | 340/172.5 |
| 3,916,387 | 10/1975 | Woodrum | 340/172.5 |
| 3,932,841 | 1/1976 | Deerfield et al. | 340/146.1 |
| 4,070,704 | 1/1978 | Calle et al. | 364/200 |
| 4,092,491 | 5/1978 | Frazer | 375/283 |
| 4,409,656 | 10/1983 | Andersen et al. | 364/200 |

(List continued on next page.)

OTHER PUBLICATIONS

GLOBECOM'92: IEEE Global Telecommunications Conference; Sriram "Methodologies For Bandwidth Allocation, Transmission Scheduling, And Congestion Avoidance In Broadband ATM".

GLOBECOM'90: IEEE Global Telecommunications Conference; Aicardi, et al. "Adaptive Bandwidth Assignments In A TDM Network With Hybrid Frames", pp. 41–42.

Local Computer Networks, 1991 16th Conference, Issued 13 Mar. 1991, R. Bolla et al, "A traffic control strategy for a DQDB–type MAN", pp. 195–196.

Wireless Communications, Selected Topics, Int'l. conference 1992, Issued Feb. 1992, K. S. Natarajan, "A hybrid medium access Protocol for Wireless LANS", pp. 134–136.

IEEE Transactions on Communications, Z. Zhang et al, "Bounds on the mean system–size and Delay for a movable–boundary integrated circuit and packet switched communications".

(List continued on next page.)

Primary Examiner—Thomas C. Lee
Assistant Examiner—Sang Y. Nahm
Attorney, Agent, or Firm—Blakely, Sokoloff, Taylor & Zafman

[57] ABSTRACT

A bus controller, a number of 1:n bus signal distributors, and a number of bus interfaces are provided for form an hierarchical serial bus assembly for serially interfacing a number of isochronous and asynchronous peripherals to the system unit of a computer system. The bus controller, bus signal distributors, and bus interfaces are provided with circuitry and complementary logic for implementing a master/slave model of flow control for serially interfacing the bus agents to each other to conduct data communication transactions. In certain embodiments, these circuitry and complementary logic further conduct connection management transactions employing also the master/slave model of flow control, implement a frame based polling schedule for polling the slave "devices", employ at least two address spaces to conduct the various transactions, support communication packet based transactions, and/or electrically represent data and/or control states.

6 Claims, 10 Drawing Sheets

U.S. PATENT DOCUMENTS

| | | | |
|---|---|---|---|
| 4,606,052 | 8/1986 | Hirzel et al. | 375/87 |
| 4,660,141 | 4/1987 | Ceccon et al. | 364/200 |
| 4,689,740 | 8/1987 | Moelands et al. | 395/550 |
| 4,713,834 | 12/1987 | Brahm et al. | 379/28 |
| 4,748,346 | 5/1988 | Emori | 307/270 |
| 4,870,704 | 9/1989 | Matelan et al. | 364/200 |
| 4,885,742 | 12/1989 | Yano | 370/85.2 |
| 4,912,633 | 3/1990 | Schweizer et al. | 395/800 |
| 4,914,650 | 4/1990 | Sriram | 370/60 |
| 4,984,190 | 1/1991 | Katori et al. | 395/200 |
| 5,001,707 | 3/1991 | Kositpaiboon | 370/94.1 |
| 5,063,574 | 11/1991 | Moose | 375/244 |
| 5,130,983 | 7/1992 | Heffner, III | 370/85.8 |
| 5,173,939 | 12/1992 | Abadi et al. | 380/25 |
| 5,179,670 | 1/1993 | Farmwald et al. | 395/282 |
| 5,237,690 | 8/1993 | Bealkowski et al. | 395/700 |
| 5,257,160 | 10/1993 | Yokohama et al. | 361/246 |
| 5,269,011 | 12/1993 | Yanai et al. | 395/280 |
| 5,282,202 | 1/1994 | Bernstein et al. | 370/94.1 |
| 5,317,597 | 5/1994 | Eisele | 375/257 |
| 5,341,131 | 8/1994 | Hoshino et al. | 340/825.21 |
| 5,341,480 | 8/1994 | Wasseman et al. | 395/287 |
| 5,361,261 | 11/1994 | Edem et al. | 370/85.3 |
| 5,379,384 | 1/1995 | Solomon | 395/308 |
| 5,386,567 | 1/1995 | Lien et al. | 395/700 |
| 5,394,556 | 2/1995 | Oprescu | 395/800 |
| 5,418,478 | 5/1995 | Van Brunt et al. | 326/86 |
| 5,426,769 | 6/1995 | Pawloski | 395/500 |
| 5,440,181 | 8/1995 | Gruender, Jr. et al. | 307/156 |
| 5,440,556 | 8/1995 | Edem et al. | 370/79 |
| 5,446,765 | 8/1995 | Leger | 375/359 |
| 5,463,620 | 10/1995 | Sriram | 370/60 |
| 5,463,624 | 10/1995 | Hogg et al. | 370/85.6 |
| 5,483,518 | 1/1996 | Whetsel | 370/13 |

OTHER PUBLICATIONS

GLOBECOM'92: IEEE Global Telecommunications Conference; Bolla et al. "A Neutral Strategy For Optimal Multiplexing Of Circuit–And Packet–Switched Traffic." 1992 pgs.

Philips' I C (Inter–Integrated Circuit) Bus, 5 pages.

Concentration Highway Interface (CHI), AT&T Microelectronics Interface Specification, Nov. 1990 (DS90–124SMOS).

ATA/ANSI 878.1, VERSION 1.9 (59 Sheets), Copyright 1992 ARCNET Trade Association.

PCMCIA PC Card Standard, Release 2.01, 1.1–4.8.9, Copyright 1992 PCMCIA.

ACCESS.bus™ Specifications–Version 2.2.

High Performance Serial Bus, P1394/Draft 6.2v0, Copyright 1993 IEEE.

SYSTEM HAVING INDEPENDENTLY ADDRESSABLE BUS INTERFACES COUPLED TO SERIALLY CONNECTED MULTI-PORTED SIGNAL DISTRIBUTORS GENERATING AND MAINTAINING FRAME BASED POLLING SCHEDULE FAVORING ISOCHRONOUS PERIPHERALS

BACKGROUND OF THE INVENTION

1. Field of the Invention

The present invention relates to the field of computer systems. More specifically, the present invention relates to serial buses for connecting peripherals to the system units of computer systems, including the associated controllers and interfaces.

2. Background Information

A number of interrelated considerations is making it desirable to have a single, relatively fast, bi-directional, isochronous, low-cost, and dynamically configurable serial bus for simultaneously connecting isochronous as well as asynchronous peripherals to the system unit of a desktop computer system. Isochronous peripherals are peripherals that generate real time natural data such as voice, motion video, and the like. These interrelated considerations include:

Connection of the Telephone to the Desktop Computer

It is expected that the merging of computing and communication will be the basis of the next generation of productivity applications on desktop computers. The movement of machine oriented and human oriented data types from one location or environment to another depends on ubiquitous and cheap connectivity. Unfortunately, the computing and communication industries have evolved independently. As a result, a wide range of desktop computer and telephone interconnects have to be supported.

Ease of Use

The lack of flexibility in reconfiguring desktop computers has been acknowledged as its Achilles heel to it's further development. The combination of user friendly graphical interfaces and the hardware and software mechanisms associated with the new generation of system bus architectures have made desktop computers less confrontational and easier to reconfigure. However, from the enduser point of view, the desktop computer's I/O interfaces such as serial/parallel ports, keyboard/mouse/joystick interfaces, still lack the attributes of plug and play or too limiting in terms of the type of I/O devices that can be live attached/detached.

Port Expansion

The addition of external peripherals to desktop computers continues to be constrained by port availability. The lack of a bi-directional, low-cost, low to mid speed peripheral bus has held back the proliferation of peripherals like telephone/fax/modem adapters, answering machines, scanners, personal digital assistants (PDA), keyboards, mouses, etc. Existing interconnects are optimized for one or two point products. As each new function or capability is added to the desktop computer, typically a new interface has been defined to address this need.

In other words, this desired serial bus is expected to provide low cost simultaneous connectivity for the relatively low speed 10–100 kbps interactive devices such as keyboard, mouse, stylus, game peripherals, virtual reality peripherals, and monitors, as well as the moderate speed 500–5000 kbps isochronous devices such as ISDN, PBX, POTS, and other audio devices. A multiplicity of both types of devices are expected to be connected and active at the same time, and yet the latter type of devices are provided with guaranteed latencies and bandwidths. Furthermore, the devices are expected to be hot attached and detached, with the serial interface being able to dynamically reconfigure itself without interrupting operation of the desktop computer system.

There are several technologies that are commonly considered to be serial buses for connecting peripherals to system units of computer systems. Each of these buses is designed to handle a specific range of communications between system units and peripherals. Particular examples of these buses include:

Apple® Desktop Bus (ADB)

ADB is a proprietary bus of Apple Computer Inc. It is a minimalist serial bus that provides a simple read/write protocol to up to 16 devices. Only basic functions are required of the controller and interface hardware. Thus, the implementation cost is expected to be low. However, ADB supports data rates only up to 90 kbps, just enough to communicate with asynchronous desktop devices such as keyboards and mouses. It is not capable of simultaneously supporting the moderate speed isochronous devices discussed earlier.

Access.bus (A.b)

A.b is developed by the Access.bus Industry Group. It is based on the $I^2C$ technology of Philips Corporation and a software model of Digital Equipment Corporation (DEC). A.b is also designed primarily for asynchronous devices such as keyboards and mouses. However A.b is generally considered to be more versatile than ADB. A.b's protocol has well defined specifications for dynamic attach, arbitration, data packets, configuration and software interface. Moderate amount of functions are required of the controller and interface hardware. Thus, the implementation cost is only marginally competitive for the desired desktop application. While addressing is provided for up to 127 devices, the practical loading is limited by cable lengths and power distribution considerations. Revision 2.2 specifies the bus for 100 kbps operation, but the technology has headroom to go up to 400 kbps using the same separate clock and data wires. However, at 400 kbps, A.b still falls short in meeting the requirements of the moderate speed isochronous devices.

IEEE's P1394 Serial Bus Specification (aka FireWire)

FireWire is a high performance serial bus. It is designed primarily for hard disk and video peripherals, which may require bus bandwidth in excess of 100 Mbps. It's protocol supports both isochronous and asynchronous transfers over the same set of 4 signal wires, broken up as differential pairs of clock and data signals. Thus, it is capable of simultaneously meeting the requirements of low speed interactive as well as moderate speed isochronous devices. However, elaborate functions are required of the controller and interface hardware, rendering FireWire to be non-price competitive for the desired desktop application. Moreover, the first generation of devices, based on FireWire's specification, are only just becoming available in the market.

The Concentration Highway Interface (CHI)

CHI is developed by American Telephone & Telegraph Corporation (AT&T) for terminals and digital switches. It is a full duplex time division multiplexed serial interface for digitized voice transfer in a communication system. The protocol consists of a number of fixed time slots that can carry voice data and control information. The current specification supports data transfer rates up to 4,096 Mbps. The CHI bus has 4 signal wires: Clock, Framing, Receive Data, and Transmit Data. Both, the Framing and the Clock signals are generated centrally (i.e. PBX switch). Thus, it is also capable of simultaneously meeting the requirements of low speed interactive as well as the moderate speed isochronous devices. Similar to FireWire, elaborate functions are also required of the controller and interface hardware. As a result, CHI is also non-price competitive for the desired desktop application.

As will be disclosed in more detail below, the present invention provides the desired serial bus assembly, including its associated controller, bridging connectors and interfaces, that advantageously overcomes the limitations of the prior art serial buses in a novel manner.

SUMMARY OF THE INVENTION

The present invention includes a bus controller, a number of 1:n bus signal distributors, and a number of bus interfaces, hierarchically interconnected together forming a serial bus assembly for serially interfacing isochronous and asynchronous peripherals to the system unit of a computer system. Together, the serial bus elements, i.e. bus controller etc., implement a master/slave model of flow control for data communication transactions between the bus agents, i.e. the system unit and functions of the peripherals. In certain embodiments, the serial bus elements further conduct connection management transactions with each other employing also the master/slave model of flow control, implement a frame based polling schedule for polling the functions of the slave peripherals and the slave serial bus elements, employ at least two address spaces to conduct the various transactions, support the usage of communication packets to conduct the transactions, and/or electrically represent data and control states.

Typically, the bus controller is disposed in the system unit, and the bus interfaces are disposed in the connecting peripherals, one bus interface per connecting peripheral. The peripherals, through their bus interfaces, are connected to the system unit, through the bus controller, using one or more bus signal distributors disposed in the system unit, stand alone bridging connectors and/or the connecting peripherals. A bus interface is always a termination point. Only a bus signal distributor may have one or more bus signal distributor(s) and/or bus interface(s) connected upstream to it. Together, the system unit, the serial bus elements, the peripherals form an hierarchy of interconnected devices.

The bus controller, the bus signal distributors, and the bus interfaces are physically connected together, preferably using low cost two signal wire cables. Preferably, together, they support a data transfer rate of up to at least at least 5 Mbps. Furthermore, electrical signals are preferably propagated between the various interconnected devices over the two signal wires in a differential manner, and data as well as a number control states are represented electrically by various voltage states and/or durations.

A connecting peripheral may be an isochronous or an asynchronous peripheral. Typically, the isochronous peripherals operate with data rates in the range of 500–5000 kbps, whereas the asynchronous peripherals operate with data rates in the range of 10–100 kbps. Furthermore, a connecting peripheral may be a multi-function peripheral, i.e. multiple functions being mapped to a single bus connection bus serviced by a single bus interface. Similarly, the system unit may support multiple "clients".

The bus controller, the bus signal distributors, and the bus interfaces are equipped with circuitry and complementary logic that implement the master/slave model of flow control for serially interfacing the interconnected peripherals to the system unit to facilitate data communication transactions between the bus agents at their respective operating speed. During operation, the bus controller systematically polls the functions of the interconnected peripherals through their bus interfaces for data communication transactions in accordance to a polling schedule which guarantees latencies and bandwidths to the isochronous functions of the interconnected peripherals. Polling of the isochronous functions of the interconnected peripherals for data communication transactions are prioritized over for all other polling and as frequent as they are necessary to meet the guaranties. Polling of the asynchronous functions of the interconnected peripherals through their bus interfaces for data communication transactions are scheduled around the polling of the isochronous functions of the interconnected peripherals for data communication transactions. Preferably, the polling schedule is dynamically adapted to the interconnected devices actually present.

In some embodiments, these circuitry and complementary logic of the serial bus elements further conduct connection management transactions among themselves employing also the master/slave model for flow control. For these embodiments, the bus controller, during operation, further polls the bus signal distributors and the bus interfaces for such transactions conducted at the serial bus elements' respective operating speeds. Polling of the bus signal distributors and bus interfaces for connection management transactions are also scheduled around polling of the isochronous functions of the interconnected peripherals for data communication transactions.

In some embodiments, these circuitry and complementary logic of the serial bus elements further implement a frame based polling schedule for polling the functions of the slave peripherals and the slave serial bus elements. For these embodiments, the bus controller conducts the polling in accordance to a schedule, which is also referred to as a super frame, having a number of subschedules, which are also referred to as soft frames. An isochronous function is polled as frequent as it is necessary in one or more soft frames of the super frame to guarantee its latency and bandwidth. However, an asynchronous function is polled only once in one soft frame of the super frame for data communication transaction. Similarly, a slave serial bus element is also polled only once in one soft frame of the super frame for connection management transaction.

In some embodiments, these circuitry and complementary logic of the serial bus elements further implement at least two address spaces to conduct the various transactions, a geographical address space and a logical address space. For these embodiments, the serial bus elements are addressed using geographical addresses of the geographical address space, and the functions of the connecting peripherals are addressed using logical addresses of the logical address space. Polling of the isochronous and asynchronous functions of the interconnected peripherals for data communication transactions are made using logical addresses, whereas polling of the serial bus elements for connection management transactions are made using geographical addresses. Preferably, the identity of a bus signal distributor and its upstream port may be inferred from the bus signal distributor's geographical address. Furthermore, the connecting bus signal distributor of a bus interface, including the connecting port, may be inferred from the bus interface's geographical address.

In some embodiments, these circuitry and complementary logic of the serial bus elements further support employment of communication packets to conduct the various transactions. For these embodiments, packet identifiers are employed to differentiate control packets from data packets, and addresses are employed as appropriate to identify the transaction parties. Preferably, transaction flow may be inferred from a packet identifier. Preferably, either geographical or logical addresses may be specified to accommodate those embodiments that support connection management transactions and implement both types of addresses.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION

In the following description for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatic or block diagram form in order not to obscure the present invention.

Figure 1:
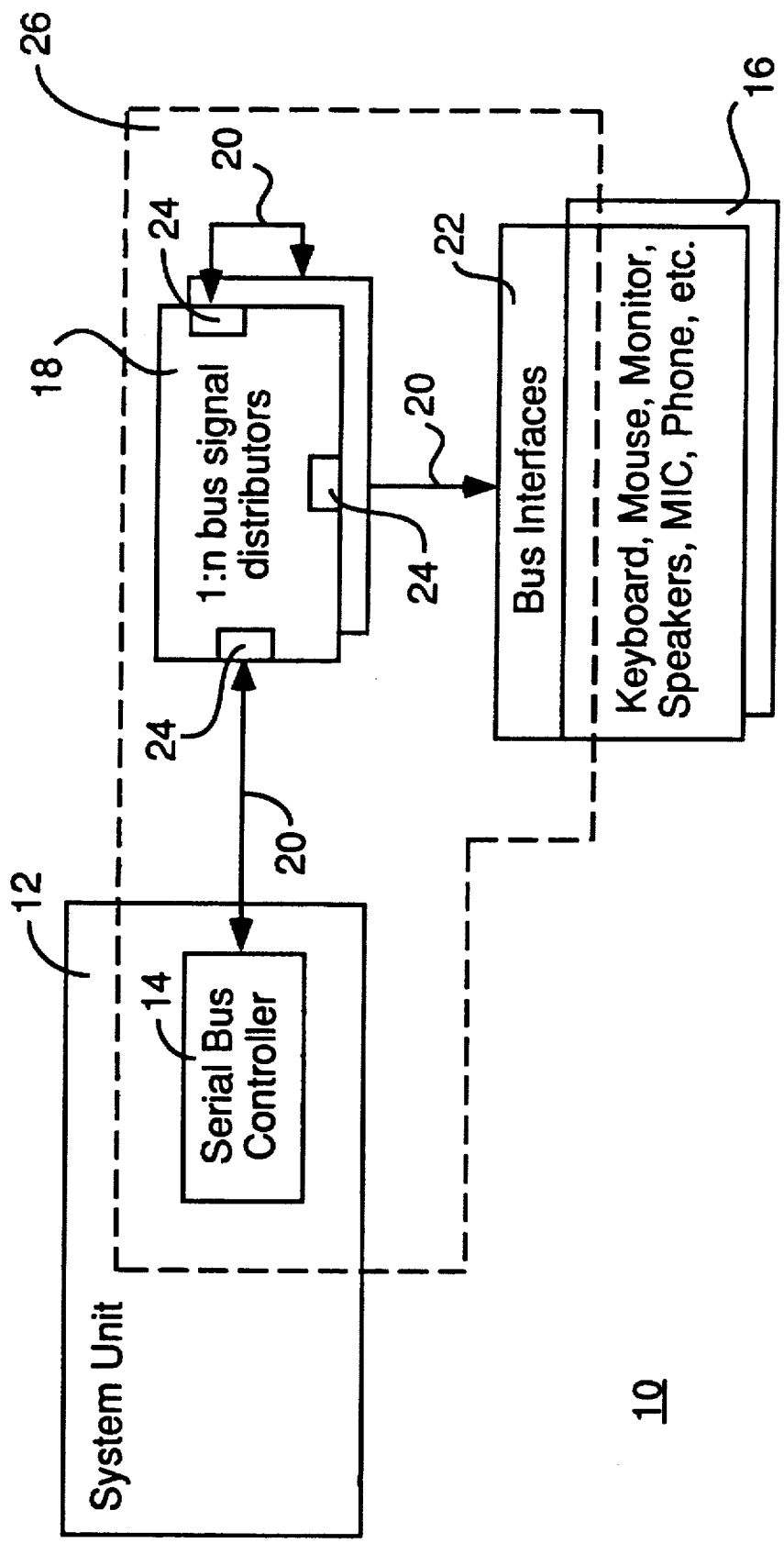
FIG. 1 illustrates an exemplary computer system incorporating the serial bus teachings of the present invention.

Referring now to FIG. 1, a block diagram illustrating an exemplary computer system incorporating the serial bus teachings of the present invention is shown. Exemplary computer system 10 comprises system unit 12 having serial bus controller 14 of the present invention, 1:n bus signal distributors 18 of the present invention, each having n+1 ports 24, and peripherals 16 having bus interfaces 22 of the present invention. Peripherals 16 are coupled to bus controller 14 of system unit 12 through 1:n bus signal distributors 18 and preferably cables 20. Collectively, bus controller 14, bus signal distributors 18, bus interfaces 22, and cables 20 form a serial bus assembly 26 interconnecting bus agents, i.e. system unit 12 and peripherals 16 to each other.

Figure 7:
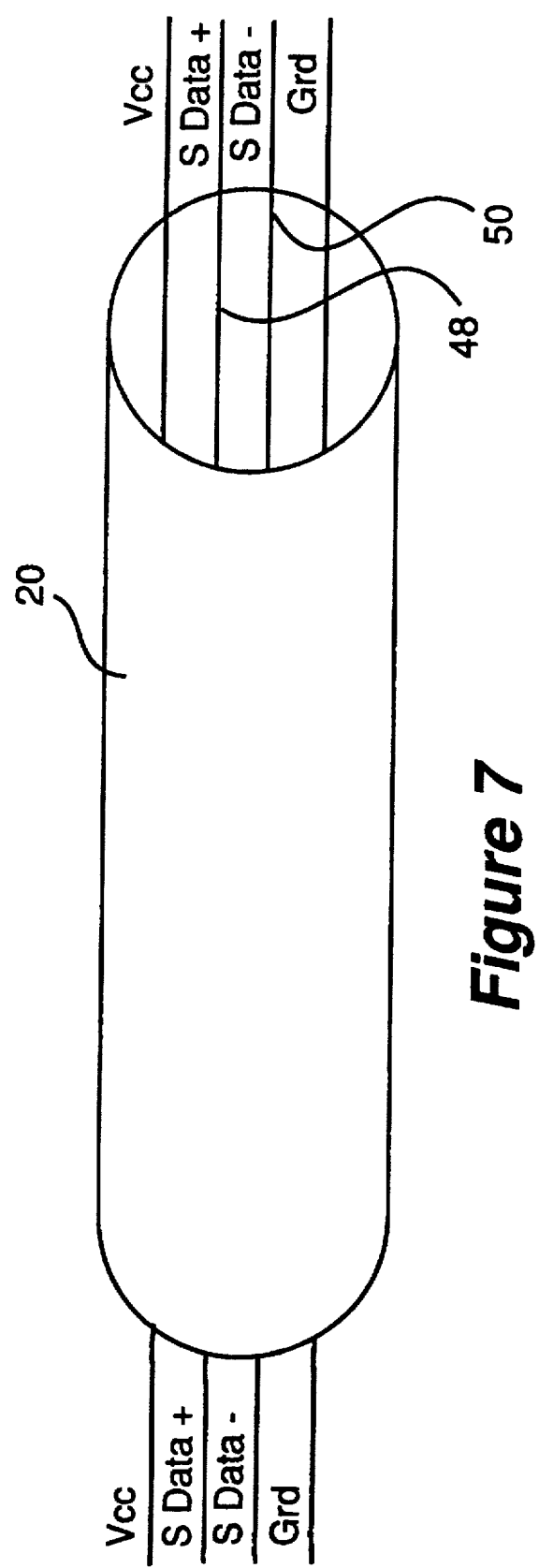
FIG. 7 illustrates one embodiment of the cables physically connecting the serial bus elements under the present invention.

Cables 20 are preferably low cost two signal wires cables 48 and 50 (as illustrated in FIG. 7). However, cable 20 are capable of supporting data transfer rates up to 5 Mbps. Furthermore, when such low cost cables 20 are employed, electrical signals are preferably propagated over the two signal wires 48 and 50 between the interconnected devices 14, 18 and 22 in a differential manner. For examples, a negative voltage differential represents a 1-bit and a positive voltage differential represents a 0-bit. For some embodiments, data and control states are further inferred from the electrical signals' voltage states and/or durations. A particular implementation of electrically represent data and control states with voltage states and/or signal durations is described in the contemporaneously filed copending application, Ser. No. 08/332,337 still pending, entitled Method And Apparatus For Serial Bus Elements Of An Hierarchical Serial Bus To Electrically Represent Data And Control States To Each Other, which is hereby fully incorporated by reference.

Except for bus controller 14, system unit 12 is intended to represent a broad category of system units of computer systems whose constitutions and functions are well known, and will not be otherwise further described. Similarly, except for bus interfaces 22, peripherals 16 are intended to represent a broad category of desktop peripherals, such as keyboards, mouses, monitors, speakers, microphone, telephones, whose constitutions and functions are also well known, and will not be otherwise further described either. Bus controller 14, bus signal distributors 18 and bus interfaces 22 will be described in more detail below with additional references to the remaining figures.

Figure 2:
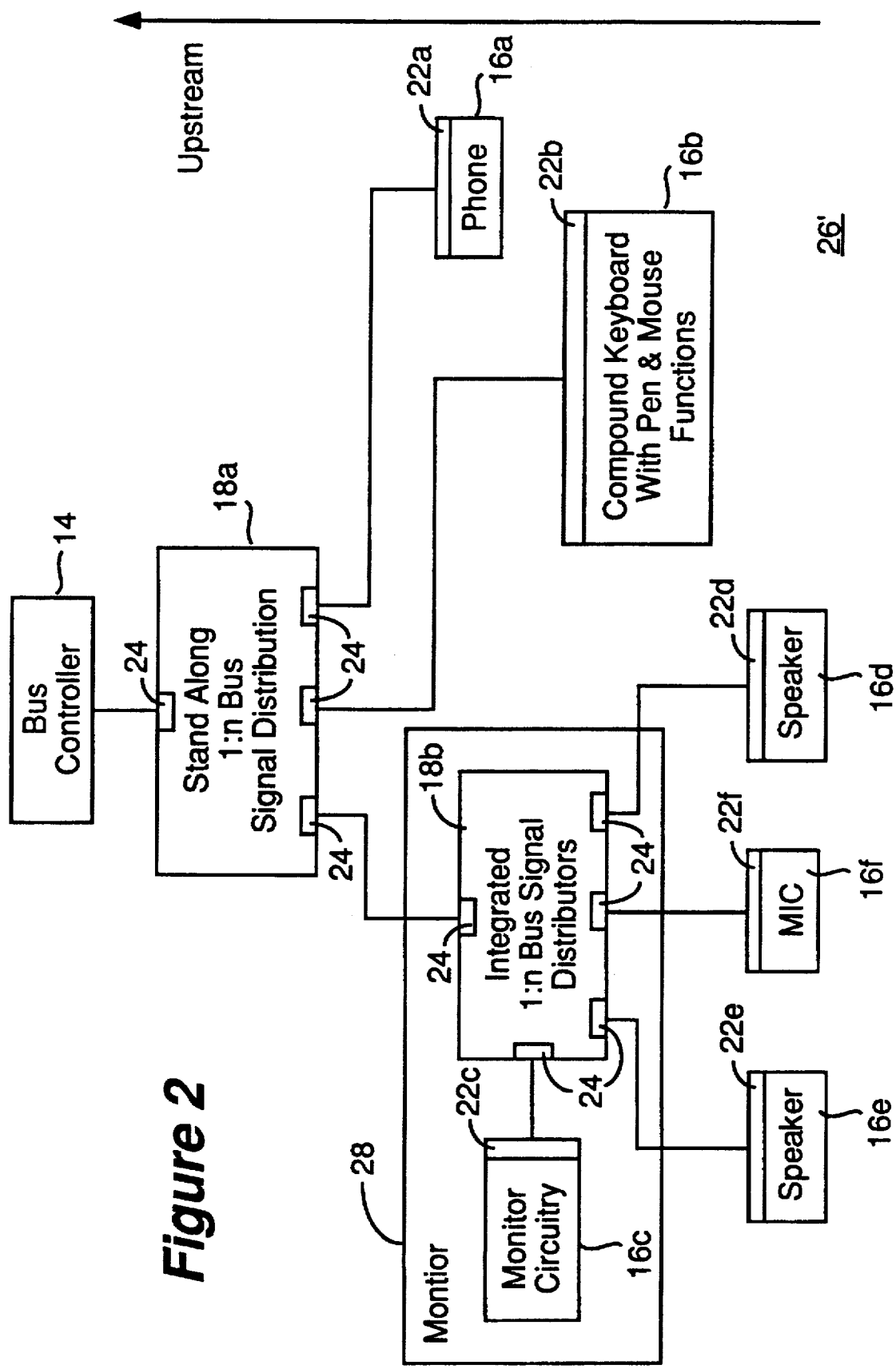
FIG. 2 illustrates one embodiment of the serial bus assembly of FIG. 1 in further detail.

FIG. 2 illustrates one embodiment of the serial bus assembly of FIG. 1 in further detail. For this embodiment, serial bus assembly 26' includes serial bus controller 14, standalone 1:n bus signal distributor 18a, integrated 1:n bus signal distributor 18b, and bus interfaces 22a–22f. The serial bus assembly 26' interconnects bus agents telephone 16a, compound keyboard 16b including keyboard, pen and mouse functions, monitor circuitry 16c of monitor 28, speakers 16d–16e and microphone 16f to system unit 12. Together, the system unit 12, the serial bus elements 14, 18a–18b and 22a–22f, and the interconnected peripherals 16a–16f form an hierarchy of interconnected devices.

Under the present invention, a bus interface 22a–22f is always a termination point. Only a bus signal distributor, e.g. 18a, may have one or more bus signal distributors, e.g. 18b, and/or one or more bus interfaces, e.g. 16a, coupled upstream to it. For the purpose of this disclosure, upstream means "towards the bus controller". Thus, except for the degenerate case where the serial bus assembly 26 has only one connecting peripheral 16, typically it is a bus signal distributor, such as 18a, that is connected upstream to the bus controller 14.

Furthermore, under the present invention, a connecting peripheral may be an isochronous peripheral, such as telephone 16a, speakers 16d–16e, and microphone 16f, or asynchronous peripherals, such as compound keyboard 16b and monitor 16c. The isochronous peripherals may operate with a data transfer rate as high as 5 Mbps, while the asynchronous peripherals may operate with a data transfer rate as high as 100 kbps. Furthermore, a connecting peripheral 16a–16f may be a multiple function peripheral, i.e. multiple functions mapping to a single bus connection point serviced by a bus interface, e.g. 22b. Similarly, although not shown, the system unit 12 may support multiple clients.

Figure 3:
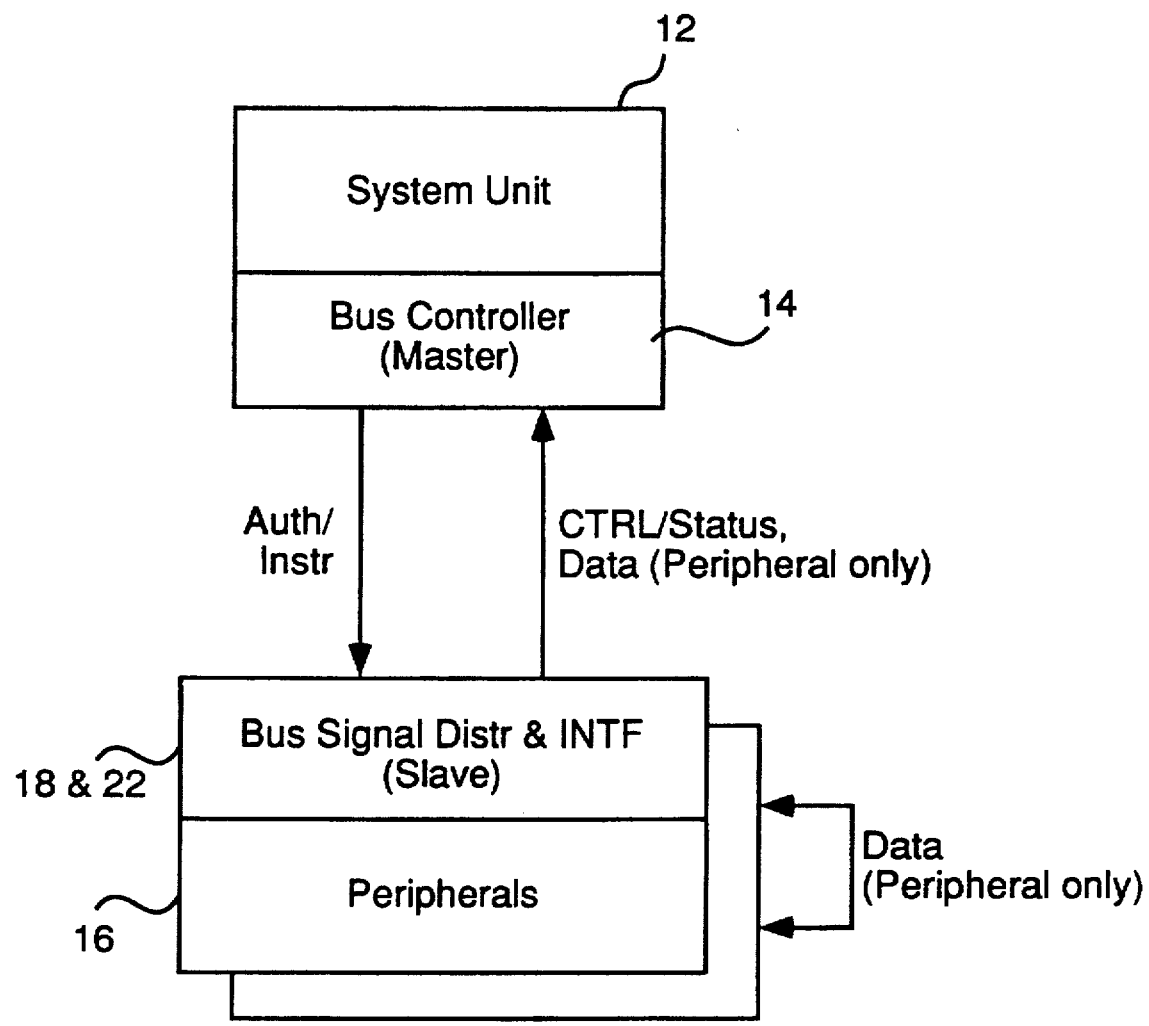
FIG. 3 illustrates a master/slave model of flow control employed by the present invention for serially interfacing the interconnected peripherals to the system unit and controlling transaction flows.

FIG. 3 illustrates a master/slave model of flow control employed by the present invention for serially interfacing the interconnected peripherals to the system unit and controlling transaction flow. As illustrated, the bus controller 14, the signal bus distributors 18, and the bus interfaces 22 cooperate to implement the master/slave model of flow control. The bus controller 14 serves as the master, and the signal bus distributors 18 as well as the bus interfaces 22 behave as slave devices to the bus controller 14.

Under the master/slave model, the bus controller 14 provides flow control for all data communication transactions between the bus agents at their respective operating speeds. The bus interfaces 22 engage in data communication transactions on behalf of the functions of the peripherals 16. However, the bus interfaces 22 accept or transmit data only if they have been authorized or instructed (aka "polled") to do so by the bus controller 14. The bus signal distributors 18 serve strictly as signal distributors. They are merely transparent conduits when data communication transactions are conducted by the bus controller 14 and the bus interfaces 22 on behalf of the bus agents. Thus, the bus signal distributors 18 never actively participate in data communication transactions, accept data or respond with data.

The bus controller 14 systematically polls the functions of the interconnected peripherals 16 through their bus interfaces 22 for data communication transactions in accordance to a polling schedule which guarantees latencies and bandwidths to the isochronous functions of the interconnected peripherals 16. Polling of the isochronous functions of the interconnected peripherals 16 for data communication transactions are prioritized over for all other polling and as frequent as they are necessary to meet the guaranty. Polling of the asynchronous functions of the interconnected peripherals 16 through their bus interfaces 22 for data communication transactions are scheduled around the polling of the isochronous functions of the interconnected peripherals 16 for data communication transactions. Preferably, the polling schedule is dynamically adapted to the interconnected peripherals 16 actually present.

In some embodiments, the bus controller 14, the bus signal distributors 18 and the bus interfaces 22 further engage in connection management transactions employing the same master/slave model for flow control. Similarly, the bus controller 14 provides flow control for conducting the connection management transactions at the serial bus elements' respective operating speeds. The bus signal distributors 18 and the bus interfaces 22 respond to the connection management transactions, replying with control/status information as appropriate. The bus controller 14, during operation, polls the bus signal distributors 18 and the bus interfaces 22 for such transactions. Polling of the bus signal distributors 18 and the bus interfaces 22 for connection management transactions are also scheduled around polling of the isochronous functions of the interconnected peripherals 16 for data communication transactions. Preferably, the expanded polling schedule is also dynamically adapted to the serial bus elements actually present.

Figure 4:
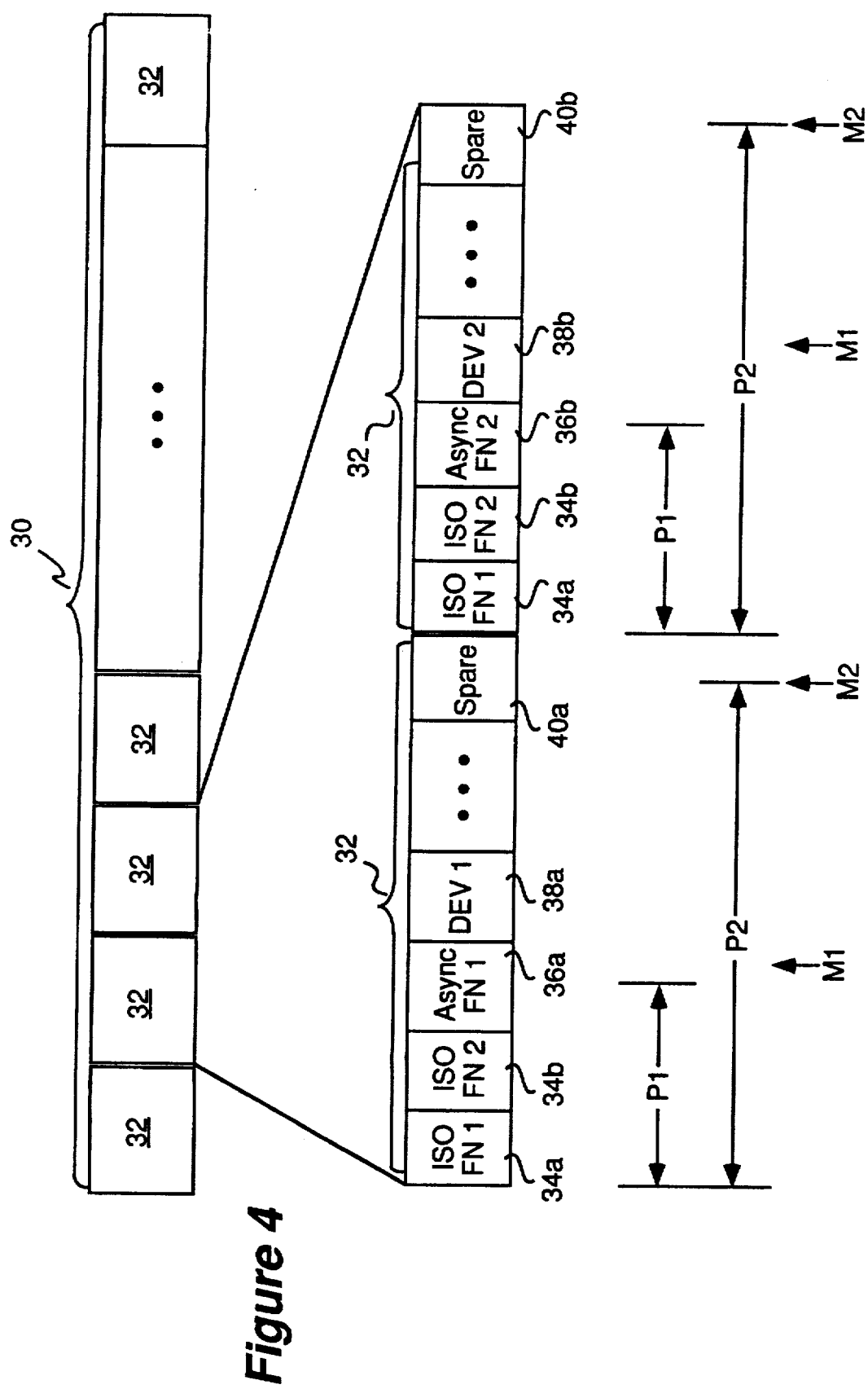
FIG. 4 illustrates a frame based polling schedule of the present invention implemented by some embodiments for polling the slave "devices"

FIG. 4 illustrate a frame based polling scheduling of the present invention implemented by some embodiments for conducting the various transactions employing the master/slave model of flow control. As illustrated, the polling schedule 30, also referred to a super frame, comprises of a number of sub-schedules 32, also referred to as soft frames. An isochronous function 34a or 34b of an interconnected peripheral 16 is polled as frequent as it is necessary in one or more soft frames 32 of the super frame 30 to guarantee its latency and bandwidth. However, an asynchronous function 36a or 36b is polled only once in one soft frame 32 of the super frame 30 for data communication transaction. Similarly, an interconnected device 38a or 38b is also polled only once in one soft frame 32 of the super frame 30 for connection management transaction.

Preferably, all isochronous functions 34a–34b are polled within a first percentage portion (P1) of a soft frame 32 to ensure the latency and bandwidth guaranties are met. Isochronous functions that cannot be accommodated within P1 are preferably rejected for insufficient capacity. The upper delimiter (M1) of P1 is also referred to as the isochronous watermark. Similarly, all polling are preferably performed within a second percentage portion (P2) of a soft frame 32 to ensure reliability of operation. Multiple soft flames 32 are employed if necessary to accommodate all asynchronous function and serial bus element polling. The upper delimiter (M2) of P2 is also referred to as the frame watermark.

Various manners in which such a frame based polling schedule may be dynamically generated and updated, are described in the contemporaneously filed copending application, Ser. No. 08/331,727 still pending, entitled Method And Apparatus For Dynamically Generating And Maintaining Frame Based Polling Schedules That Guaranty Latencies And Bandwidths To Isochronous Functions, which is hereby fully incorporated by reference.

Figure 5:
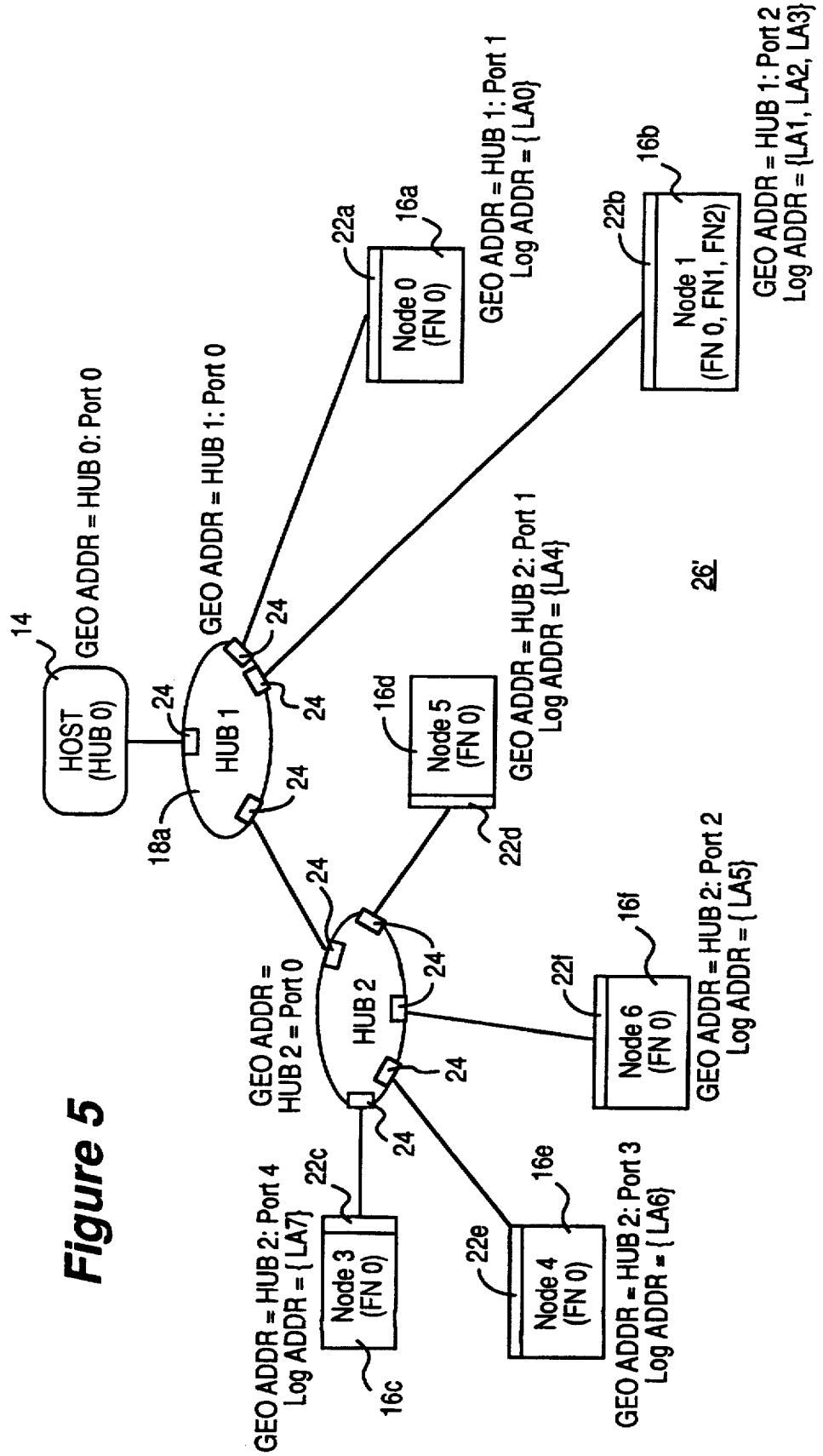
FIG. 5 illustrates geographical and logical addressing of the present invention implemented by some embodiments for addressing serial bus elements and functions of bus agents.

FIG. 5 illustrates geographical and logical addressing of the present invention implemented by some embodiments for addressing the serial bus elements and functions of bus agents. For ease of explanation, the same exemplary serial bus assembly of FIG. 2 is used. However, the bus controller 14 is labeled as Host, also referred to as Hub0. The bus signal distributors 18a–18b are labeled as Hub1 and Hub2. The peripherals 16a–16f including their corresponding bus interfaces 22a–22f are jointly labeled as Node0 through Node6. The functions of peripherals 16a–16f are labeled as FN0, FN1, etc.

As illustrated, the serial bus elements and functions of the bus agents are assigned geographical as well as logical addresses (GEO ADDR & LOG ADDR) of a geographical and a logical address space. More specifically, the Hubs 14, 18a–18b and the Nodes 22a–22f are assigned GEO ADDRes, whereas the functions of the Nodes 16a–16f are assigned LOG ADDRes. Preferably, the Hub identity as well as the upstream port of the Hub may be inferred from the GEO ADDR of a Hub 14, and 18a–18b, and the connecting Hub as well as the connecting port of the connecting Hub may be inferred from the GEO ADDR of a Node 22a–22f. In one embodiment, the LOG ADDRes are assigned to the functions of the Nodes 16a–16f in a chronological manner.

For examples, in the illustrated exemplary application, Hub1 and Hub2 18a and 18b are assigned the GEO ADDRes of "Hub1:Port0" and "Hub2:Port0" respectively, identifying the Hubs 18a and 18b as "Hub1" and "Hub2" respectively, and in each case, the upstream port being "Port0". Node1 and Node4 22b and 22e are assigned the GEO ADDRes of "Hub1:Port2" and "Hub2:Port3" respectively, identifying the connecting Hubs 18a and 18b as "Hub1" and "Hub2" respectively, and the connecting ports of connecting Hubs 18a and 18b as "Port2" and "Port3" respectively. The functions of Node1 16b are assigned the LOG ADDRes of "LA1", "LA2" and "LA3", whereas the function of Node4 16e is assigned the LOG ADDR of "LA6".

Preferably, the GEO ADDRes and the LOG ADDRes are dynamically assigned at power on or reset, and updated in response to live detachment of interconnected devices or attachment of additional devices, by the bus controller 14 in cooperation with the bus signal distributors 18 and the bus interfaces 22. A particular implementation of such dynamic connection management is described in the contemporaneously filed copending application, Ser. No. 08/332,375 still pending, entitled Method And Apparatus For Dynamically Determining And Managing Connection Topology Of An Hierarchical Serial Bus Assembly, which is hereby fully incorporated by reference.

For these embodiments, the GEO ADDRes are used to conduct connection management transactions among the serial bus elements, whereas the LOG ADDRes are used to conduct data communication transactions among the functions of the bus agents The separation of the two types of transactions into the two separate address spaces facilitate dynamic connection management of the serial bus elements, without having to interrupt services to the functions of the bus agents.

Figure 6:
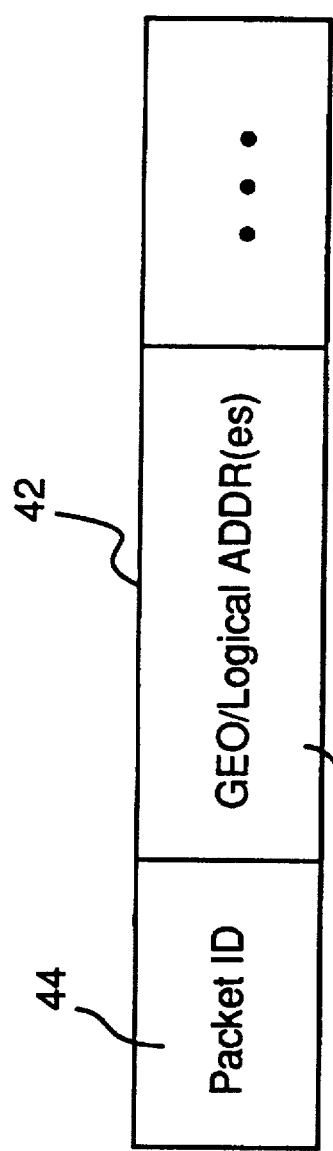
FIG. 6 illustrates the essential elements of communication packets of the present invention implemented by some embodiments for conducting transactions employing the master/slave model of flow control.

FIG. 6 illustrates the essential elements of communication packets of the present invention implemented by some embodiments for conducting the various transactions employing the master/slave model of flow control. For these embodiments, packet identifiers 44 are employed to differentiate control packets from data packets. Control packets are packets employed by the bus controller 14 to authorize or instruct the bus signal distributors 18 and the bus interfaces 22 to engage in transactions. Control packets may also include packets employed by the bus signal distributors 18 and the bus interfaces 22 to acknowledge authorizations or instructions from the bus controller 14. Furthermore, addresses 46 are employed as appropriate to identify the transaction parties. As will be appreciated that under the master/slave model of flow control, the bus controller 14 as a transaction participant may often be inferred, and therefore its address may be omitted.

Preferably, transaction flows, such as from bus controller 14 to a function, from a first function to a second function, may be inferred from the packet identifiers 44. Preferably, either geographical or logical addresses 46, i.e. "HubX-:PortY" or "LAz", may be specified to accommodate those embodiments that support connection management transactions and implement both types of addresses.

A particular implementation of employing such communication packets to conduct the various transactions is described in the contemporaneously filed copending application, Ser. No. 08/332,513, now abandoned, entitled Method And Apparatus For Exchanging Data, Status And Commands Over An Hierarchical Serial Bus Assembly Using Communication Packets, which is hereby fully incorporated by reference.

Figure 8:
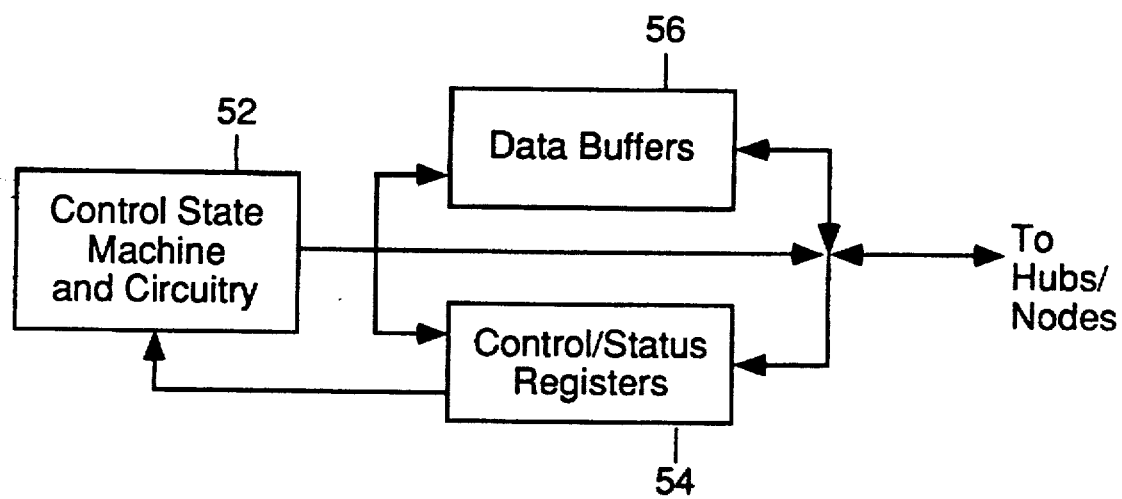
FIGS. 8–9 illustrate one embodiment of the bus controller of the present invention including its associated software.
Figure 9:
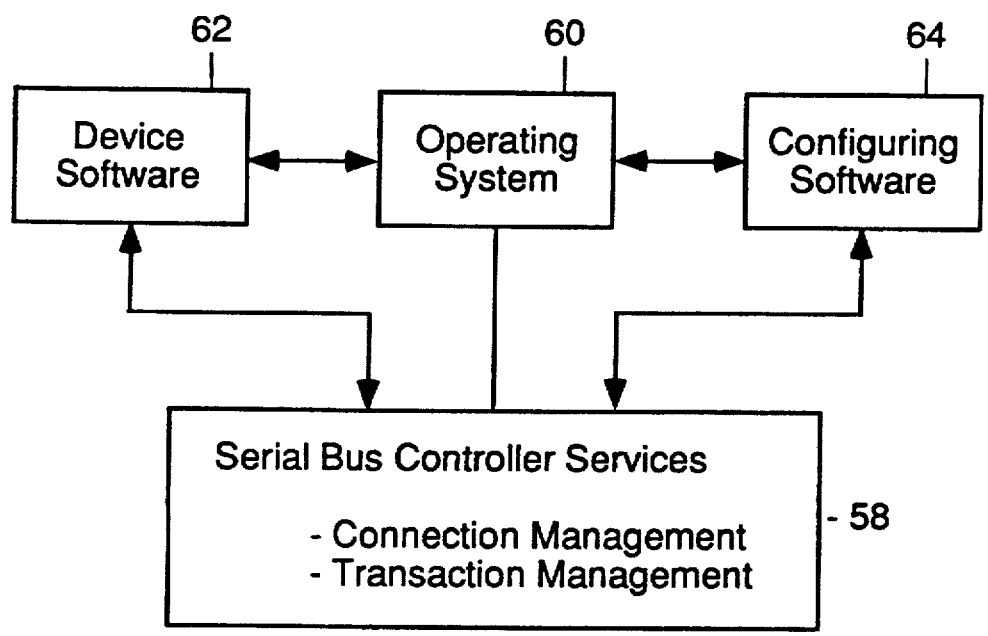

FIGS. 8–9 illustrate one embodiment of the bus controller of the present invention. In this embodiment, the bus controller 14 includes a control state machine and circuitry 52, control/status registers 54, data buffers 56, and bus controller software services 58. The control/status registers 54 are used to store the various control and status data. For examples, the serial bus elements present, their interconnection topology, the functions of the various interconnected peripherals, the geographical addresses assigned to the serial bus elements, the logical addresses assigned to the functions of the interconnected peripherals. The data buffers 56 are used to buffer the data of the data communication transactions between the bus agents. The control state machine and circuitry 52 operates the hardware, controlling data communication transactions and employing the above described master/slave model of flow control, under the programming of the bus controller software services 58. For some embodiments, the control state machine and circuitry 52 further operates the hardware, controlling connection management transactions, implementing the master/slave model of flow control with frame based polling schedule, employing geographical and logical addressing, supporting communication packet based transactions, and/or inference of data and control states from states of the propagation electrical signals.

The bus controller software services 58 program the control state machine and circuitry 52 responsive to the operating system 60 and other software such as device and configuring software 62 and 64 of the system unit 12. In particular, the services include connection management such as detection of serial bus elements present, detection of their interconnection topology, detection of the functions of the interconnected peripherals, and assignment of the geographical and logical addresses. The services further include transaction management such as generation and maintenance of the polling schedule, polling of the serial bus elements and functions of the bus agents, acknowledgment of certain responses of the serial bus elements and functions of the bus agents, and exchange of data with functions of the bus agents.

For a more detailed description of the bus controller hardware and the bus controller software services 58, refer to the incorporated by reference copending applications, Ser. Nos. 08/332,375, 08/331,727, 08/332,573 and 08/332,337. It should be noted that the allocation of functions to the hardware and software services of the bus controller 14 is implementation dependent. The present invention may be practiced with any number of allocations, ranging from minimal hardware usage to minimal employment of software services.

Figure 10:
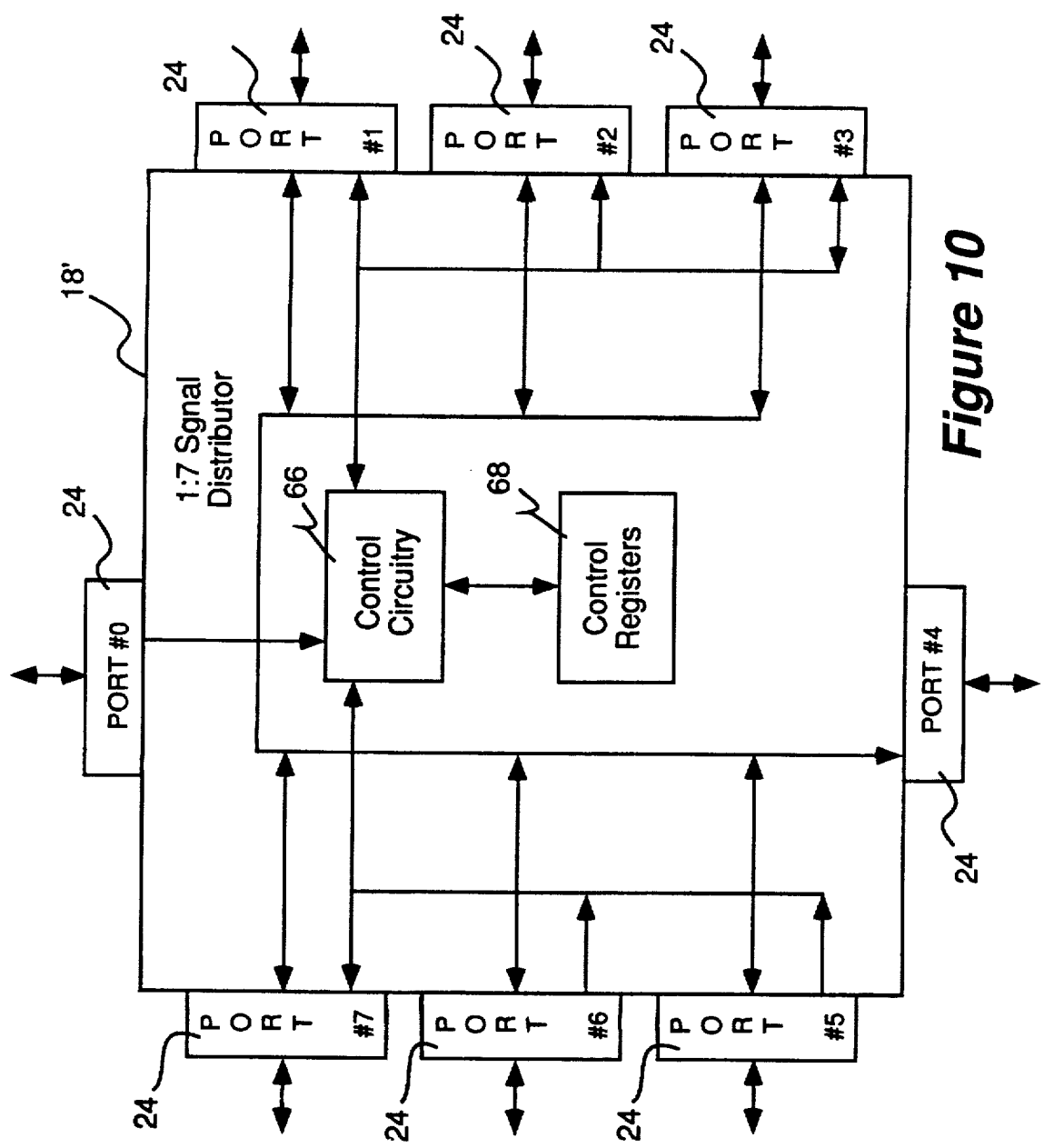
FIGS. 10–11 illustrate one embodiment of the 1:n bus signal distributor of the present invention including its port circuitry.
Figure 11:
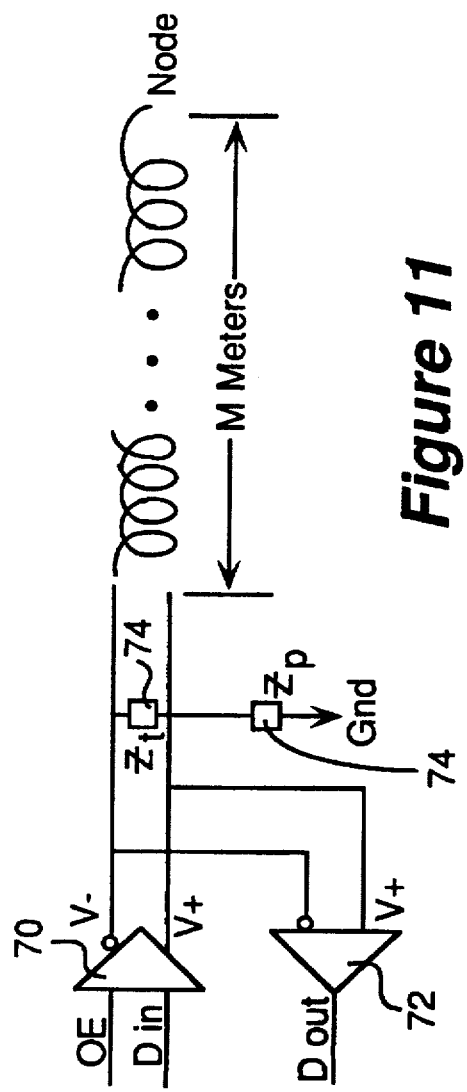

FIGS. 10–11 illustrate one embodiment of the bus signal distributor of the present invention. The illustrated embodiment is a 1:7 bus signal distributor 18' having control circuitry 66, control registers 68, and 8 ports 24. Port 0 24 is used to connect the bus signal distributor 18' upstream to the bus controller 14 or another bus signal distributor 18. Ports 1–7 are used to connect up to a total of 7 bus signal distributors 18 and/or bus interfaces 22 to itself. The control registers 68 are used to store its own control and status information such as whether a port 24 has a bus interface 22 connected to it or not, and whether the port 24 is turned ON/OFF. The control circuitry 66 operates the bus signal distributor 18' responsive to instructions from the bus controller 14.

In embodiments where the low cost two signal wire cables 20 are used to interconnect the serial bus elements, and electrical signals are preferably propagated in a differential manner, each port 24 comprises two differential amplifiers 70 and 72 for generating the differential signals. Preferably, each port 24 further having two resistors 74 coupled to ground as shown, pulling the signals on the two wires to ground, thereby allowing the absence or presence of a connected bus interface 22 to be discernible. The appropriate values of resistors 74 may be determined empirically depending on individual implementations.

For a more detailed description of the bus signal distributor 18, refer to the incorporated by reference copending application, Ser. No. 08/332,375 still pending.

Figure 13:
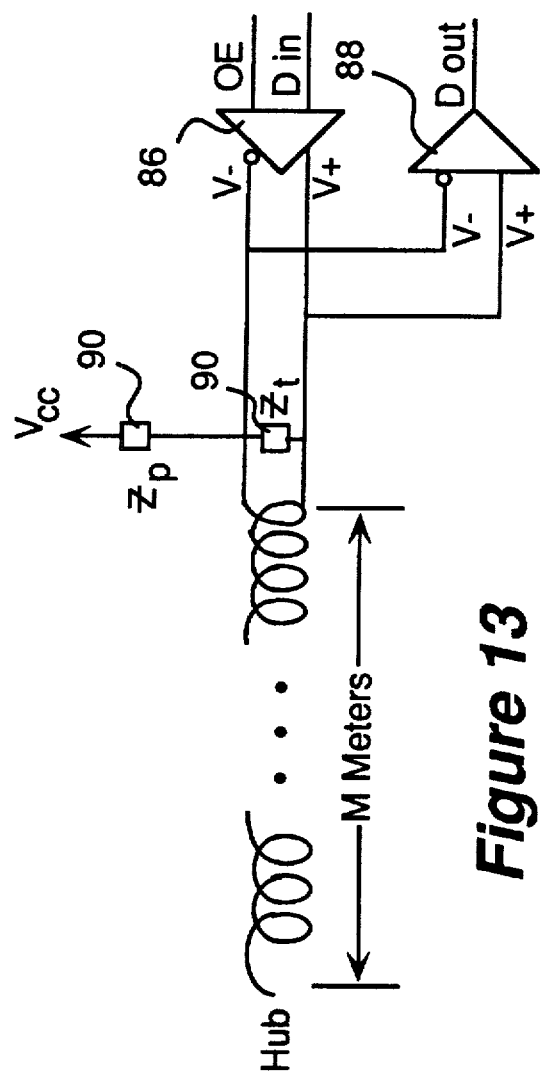
FIGS. 12–13 illustrate one embodiment of the bus interface of the present invention including its connector circuitry.
Figure 12:
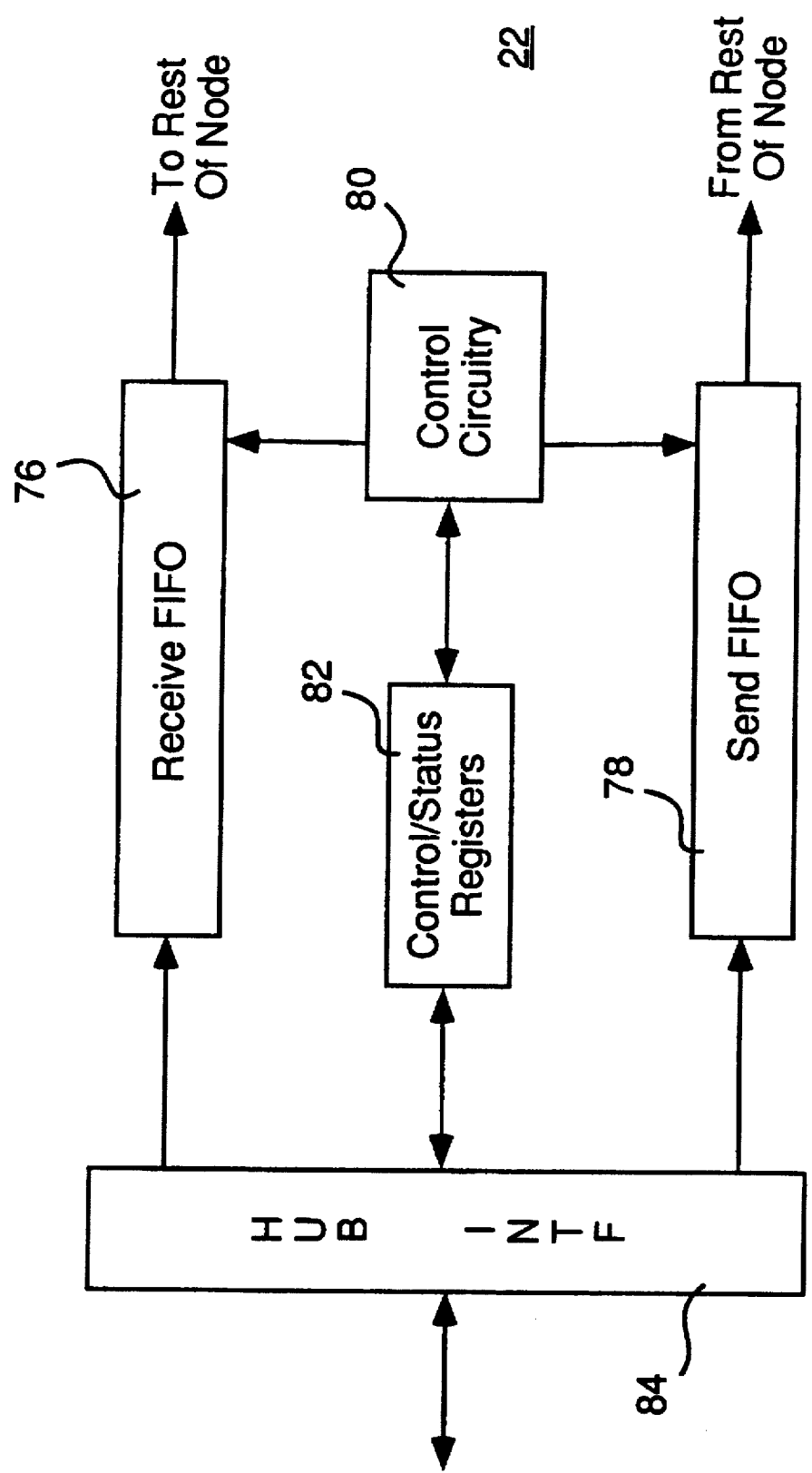

FIGS. 12–13 illustrate one embodiment of the bus interfaces of the present invention. For this embodiment, the bus interface 22 comprises control circuitry 80, control/status registers 82, a connector interface 84 and two FIFOs 76–78, a Receive FIFO 76 and a Send FIFO 78. Receive and Send FIFOs 76–78 are used to stage the receive and send data for data communication transactions. The control/status registers 68 are used to store its own control and status information such as its assigned geographical address, functions of its "host" peripheral, and their assigned logical addresses. The control circuitry 66 operates the bus interface 22 on behalf of the "host" peripheral and the "host" peripheral's functions, responsive to authorizations and instructions from the bus controller 14.

In embodiments where the low cost two signal wire cables 20 are used to interconnect the serial bus elements, and electrical signals are preferably propagated in a differential manner, the connector interface 84 comprises two differential amplifiers 86 and 88 for generating the differential signals. Preferably, the connector interface 84 further includes two resistors 90 coupled to Vcc as shown, pulling the signals on the two wires to Vcc complementary to the port circuitry of a connecting bus signal distributor 18. The appropriate values of resistors 90 may also be determined empirically depending on individual implementations.

For a more detailed description of the bus interface 22, refer to the incorporated by reference copending applications, Ser Nos. 08/332,375, 08/331,727, still pending, Ser. No. 08/332,573 abandoned and Ser. No. 08/332,337 still pending.

Thus, a method and apparatus for serially interfacing isochronous and asynchronous peripherals to the system unit of a computer system using hierarchical connections has been described. For additional information about the method and apparatus of the present invention, refer to the enclosed Appendices.

While the present invention has been described in terms of the above embodiments, those skilled in the art will recognize that the invention is not limited to the embodiments described. The method and apparatus of the present invention can be practiced with modification and alteration within the spirit and scope of the appended claims. The description is thus to be regarded as illustrative instead of limiting on the present invention.

What is claimed is:

1. A serial bus assembly for serially interfacing one or more isochronous and/or asynchronous peripherals to a system unit of a computer system, the serial bus assembly comprising:

one or more independently addressable bus interfaces, one for each peripheral, for independently coupling the peripherals to the system unit, conducting bus management transactions including configuration management transactions with a bus master, and facilitating data transactions with independently addressable functions of their respective peripherals, each peripheral having one or more independently addressable functions, responsive to authorizations received from the bus master, each bus interface being a terminal point of the serial bus assembly;

zero or more independently addressable bus signal distributors, each having a plurality of ports, for coupling said one or more bus interfaces upstream towards the bus master, and serving as conduits for bus signal distributions, wherein if the serial bus assembly has only a single bus interface, the single bus interface is coupled to the bus master, and if the serial bus assembly has more than one bus interface, each bus interface is coupled upstream to a bus signal distributor, and each bus signal distributor is in turn coupled upstream to another bus distributor, except for one bus signal distributor, which is coupled upstream to the bus master;

an addressable bus controller coupled upstream to the system unit, and downstream to either a bus signal distributor or a bus interface depending on the number of bus interfaces included in the serial bus assembly, for functioning as the bus master, authorizing the zero or more bus signal distributors, the bus interface(s) and the function(s) of the peripheral(s) to conduct transactions, conducting management transactions including configuration management transactions with the zero or more bus signal distributors and the bus interface(s), and facilitating data transactions with the system unit, said bus controller dynamically generating and maintaining a frame based polling schedule for polling said functions of said peripherals for data communication transactions, said dynamically generated and maintained frame based polling schedule favoring isochronous peripherals over asynchronous peripherals.

2. The apparatus as set forth in claim 1, wherein said bus controller dynamically determines and keeps track of connection topology between said bus controller, said zero or more bus signal distributors, and said one or more bus interfaces.

3. The apparatus as set forth in claim 1, wherein said bus controller, said bus signal distributors and said bus interfaces support a geographical and a logical address space, said bus controller polls said functions of said peripherals for data transactions in said logical address space.

4. The apparatus as set forth in claim 1, wherein said bus controller further polls said zero or more bus signal distributors and said one or more bus interfaces for management transactions including configuration management transactions in said dynamically generated and maintained frame based polling schedule.

5. The apparatus as set forth in claim 1, wherein said bus controller, said bus signal distributors and said bus interfaces support a geographical and a logical address space, said bus controller polls said bus signal distributors and said one or more bus interfaces for management transactions including configuration management transactions in said geographical address space.

6. The apparatus as set forth in claim 1, wherein said bus controller employs a number of element packets having packet types identified by packet identifiers to create communication packets for facilitating data transactions with said system unit and/or said functions of said peripherals, and for conducting management transactions including configuration management transactions with said zero or more bus signal distributors and said one or more bus interfaces, said bus controller, said zero or more bus signal distributors, and said one or more bus interfaces employing a predetermined control flow protocol for exchanging said communication packets.

* * * * *

UNITED STATES PATENT AND TRADEMARK OFFICE
CERTIFICATE OF CORRECTION

PATENT NO.    : 5,615,404
DATED         : March 25, 1997
INVENTOR(S)   : Knoll et al.

It is certified that error appears in the above-identified patent and that said Letters Patent is hereby corrected as shown below:

In column 8 at line 26 delete "flames 32" and insert --frames 32--

Signed and Sealed this

Twenty-ninth Day of July, 1997

Attest:

BRUCE LEHMAN

Attesting Officer

Commissioner of Patents and Trademarks